UNITED STATES PATENT OFFICE.

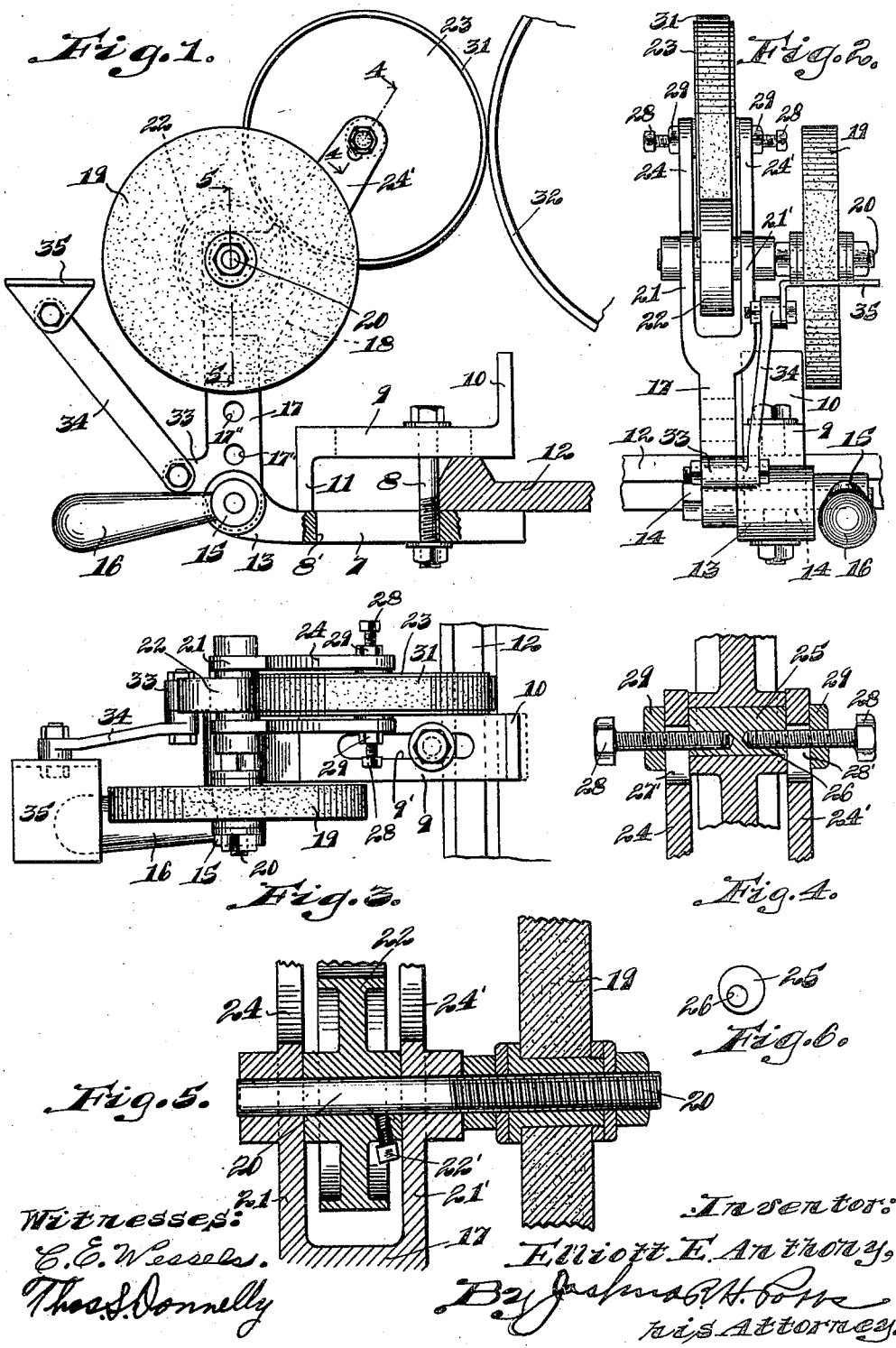

ELLIOTT E. ANTHONY, OF CHICAGO, ILLINOIS.

TOOL GRINDER.

1,407,455.   Specification of Letters Patent.   Patented Feb. 21, 1922.

Application filed November 10, 1919. Serial No. 337,088.

*To all whom it may concern:*

Be it known that I, ELLIOTT E. ANTHONY, a citizen of the United States, and a resident of the city of Chicago, county of Cook, and State of Illinois, have invented certain new and useful Improvements in Tool Grinders, of which the following is a specification.

My invention relates to new and useful improvements in tool grinders, and has for its object the provision of a tool grinder which may be attached to a lathe.

Another object is the provision in a tool grinder of means for securing the same to a lathe, permitting of adjustment of the tool grinder relatively to the lathe.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of my invention applied to a lathe showing parts in section, Fig. 2 is a rear elevational view of my invention, Fig. 3 is a top plan view of my invention, Fig. 4 is a sectional view taken on substantially line 4—4 of Fig. 1, Fig. 5 is a sectional view taken on substantially line 5—5 of Fig. 1, and Fig. 6 is a side elevational view of a journal embodied in my invention.

The approved form of construction comprises an arm 7, having an elongated slot 8' therein. Projecting through the slot 8' and through a co-operating member 9 is a bolt 8 provided with suitable nuts and washers. The member 9 is formed Z shaped and has projecting in opposite directions from each of its ends, the members 10 and 11. When the members 7 and 9 are in assembled relation upon the bolt 8, these members may be securely clamped by tightening the nut on the bolt 8 to the bed 12 of a lathe. The free end of socket 13 is angularly turned and provided with a socket therethrough, in which engages a bolt 14.

My invention is designed to be used in conjunction with a lathe and is so constructed that the lathe may be utilized for rotating the grinding member 19. In use, the device is clamped upon the lathe bed 12 in the manner shown in Fig. 1. The member 23 is then moved by swinging the arm 17 upon the bolt 14 as a pivot, until the member 23 is brought into contact with one of the steps on the cone of the lathe. The member 15 is then tightened so as to retain the device in such a position that a revolution of the step 32 will cause the member 23 to rotate. The member 23 is retained in frictional contact on its periphery with the periphery of the member 22. The position of the member 23 relatively to the member 22 may be regulated by changing the relative position of the bolts 28 in the slots 28' and 27'. The relative position of the member 23 to the member 22 may also be regulated by turning the roller 25, this adjustment being possible because of the eccentrical arrangement of the socket 26. The member 22 is rigidly mounted upon the shaft 20 by means of a suitable set screw 22' so that upon rotation of the member 22, the grinding member 19 which is rigidly mounted upon the shaft 20 is also caused to rotate. It is thus seen that the attachment is provided for a lathe whereby the operator of the lathe will have present close at hand at all times a suitable tool grinder which may be set into operation very quickly by swinging the frame which comprises the members 17 and 18 upon the bolt 14 as a pivot. Inasmuch as the device is operated by means of the steps of the cone, the tool grinder is never in the way of the operator of the lathe.

As already pointed out, the frame may be adjusted vertically relatively to the plane of the bed 12. This adjustment may be further carried out by means of the arm 7. By reversing the arm 7, that is, by turning it over so that the turned portion projects downwardly, the frame is considerably lower relatively to the bed 12 of the lathe. As clearly seen in Fig. 1, the members 10 and 11 are of different lengths, thus providing a device which may be applied to a lathe in which the beads of the beds may be of different sizes.

The member 14 projects through the socket 13 and is receivable in an interiorly threaded socket 15 which is provided with a suitable handle 16. A form 17 is provided adjacent its lower end with a suitable opening 17' and through which the bolt 14 projects so as to securely clamp the member 17 to the arm 7. The member 17 is provided with a plurality of openings 17" by means of which the member 17 may be quickly adjusted relatively to the arm 7. The member 9 is also provided with a slot 9' through which the bolt 8 projects. By virtue of the slots 8' and 9', the position of the arm 17 relatively horizontally to the lathe bed 12 may be adjusted. The arm 17 is provided adjacent its upper end with an angularly extending branch 18 which is bifurcated adjacent its upper end to form the bifurcated portions 24 and 24'. The member 17 adjacent its upper end is also bifurcated to form the bifurcated portions 21 and 21'. Mounted upon a shaft 20 which projects through the bifurcated portions 21 and 21', and intermediate these portions is a wheel 22. One end of the axle 20 projects beyond the member 21 and has rigidly mounted upon it a suitable tool grinding member 19 comprising a wheel of sand-stone or emery. Positioned between the bifurcated portions 24 and 24' is a wheel 23 having a hub, in the bore of which is positioned a roller 25 in each end of which is formed an interiorly threaded eccentrically arranged socket, each being adapted to receive a threaded bolt 28 which projects through the slots 27' and 28' formed respectively in the bifurcated portions 24 and 24'. Positioned upon each of the bolts 28 is a lock nut 29 which engages against the outer surface of the members 24 and 24'. The member 23 is provided upon its periphery with a non-abrasive tire 31, such as rubber or the like. Projecting from one side of the member 17, adjacent its lower end, is a leg 33 to which is pivotally connected one end of an arm 34. Pivotally mounted upon the opposite end of the arm 34 is a table or rest 35 upon which the tool is placed while the grinding operation is being performed.

If it is desired to use the member 9 with a lathe bed which has a larger bead than is shown the member 9 is reversed so that the member 7 engages the member 10.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. A grinding tool comprising a frame; a vertically adjustable arm swingably mounted on said frame; means for securing said frame to a lathe; a grinding member rotatably mounted on the upper end of said arm; means for rotating said grinding member; and means engaging with said last mentioned means for actuating the same, substantially as described.

2. A tool sharpening attachment for a lathe, comprising a detachable support; an upright swingably mounted on said support and adjustable vertically relative to said support; a grinding member mounted on said support; a friction disk secured to said grinding member; a friction wheel on said upright engaging said disk and the cone of said lathe; and binding means for retaining said wheel in operative engagement with said cone.

3. A grinding tool comprising a frame; an upright swingably mounted on said frame; a clamp for securing said frame to the bed of a lathe at one side of the cone thereof; a friction disk on said frame engaging said grinding member; and a friction wheel adjustably mounted to engage said first mentioned friction disk and the cone of said lathe for rotating said grinding member.

4. A tool sharpening attachment for a lathe, comprising a detachable support; a bore at one end of said support; a vertically adjustable upright engaging said support and having spaced apertures therein; a bolt projecting through said bore and one of said apertures; a handle having a threaded socket engaging the end of said bolt to lock said upright in position; a grinding member on said upright; a friction disk secured to said grinding member; and a friction wheel engaging said friction disk and the cone of said lathe to drive said grinding member.

5. A tool sharpening attachment for a lathe, comprising a detachable support; an upright swingably mounted on said support and adjustable vertically relative to said support; a grinding member mounted on said support; a friction disk secured to said grinding member; an extension on said upright; a friction wheel adjustably mounted on said extension and engaging said disk and the cone of said lathe; and means for retaining said wheel in operative or inoperative engagement with said cone.

6. A tool sharpening attachment for a lathe, comprising a detachable support; an upright swingably mounted on said support and adjustable vertically relative to said support; a shaft mounted in said upright; a grinding member mounted on said shaft; a friction disk secured to said grinding member; a bifurcated extension on said upright; bearing slots in the ends of said extension; a friction wheel having a bore, adapted to be mounted in said extension; a roller engaging said bore in said wheel and having opposite eccentrically arranged threaded sockets in its ends; threaded bolts projecting through said slots and engaging said sockets; lock nuts on said bolts to retain same in position; and means for retaining said friction wheel in operative or inoperative engagement with one side of the cone of said lathe.

In testimony whereof, I have signed my name to this specification in the presence of two subscribing witnesses.

ELLIOTT E. ANTHONY.

Witnesses:
 JOSHUA R. H. POTTS,
 ROSE K. TRIB.